United States Patent [19]
Simuttis

[11] Patent Number: 5,895,032
[45] Date of Patent: Apr. 20, 1999

[54] HYDRAULIC BEARING

[75] Inventor: Arnold Simuttis, Bad Kreuznach, Germany

[73] Assignee: Firma Carl Freudenberg, Weinheim, Germany

[21] Appl. No.: 08/839,609

[22] Filed: Apr. 15, 1997

[30] Foreign Application Priority Data

May 24, 1996 [DE] Germany ............................. 196 20976

[51] Int. Cl.[6] .................................................. F16F 5/00
[52] U.S. Cl. ...................... 267/140.12; 267/219; 248/562
[58] Field of Search ...................... 267/140.11, 140.12, 267/140.13, 140.14, 140.2, 219, 35; 248/562, 636; 180/300, 312

[56] References Cited

U.S. PATENT DOCUMENTS

| | | | |
|---|---|---|---|
| 4,647,023 | 3/1987 | Ray et al. ...................... | 267/140.13 X |
| 4,666,137 | 5/1987 | Hamaekers et al. ................ | 267/140.13 |
| 4,773,634 | 9/1988 | Hamaekers ...................... | 267/140.13 X |
| 4,822,009 | 4/1989 | Hirchenhain et al. .............. | 267/140.13 |
| 4,903,951 | 2/1990 | Miyamoto et al. ................. | 267/140.13 |
| 5,029,824 | 7/1991 | LaBeau et al. ...................... | 267/140.13 |
| 5,104,100 | 4/1992 | Simuttis ............................... | 267/219 X |

FOREIGN PATENT DOCUMENTS

| | | | |
|---|---|---|---|
| 346227 | 12/1989 | France ............................ | 267/140.13 |
| 596787 | 5/1994 | France ............................ | 267/140.13 |
| 37 07 445 A1 | 9/1988 | Germany . | |

*Primary Examiner*—Matthew C. Graham
*Assistant Examiner*—Pamela J. Lipka
*Attorney, Agent, or Firm*—Kenyon & Kenyon

[57] ABSTRACT

A hydraulic bearing includes a supporting bearing and a bearing member braced against each other by an essentially truncated conical elastic spring element of an elastomeric material. The spring element bounds a working chamber and a compensating chamber filled with damping fluid, these chambers being separated from one another by a dividing wall and being in fluid communication with one another via a damping channel. The elastic spring element has two compression-spring sections radially opposite one another and two push-action-spring segments radially opposite one another and the compression-spring sections. The supporting bearing radially overlaps the elastic spring element in the compression-spring sections, and the elastic spring element and the supporting bearing are interconnected by a radial surface area. The supporting bearing and the elastic spring element are interconnected in the push-action-spring sections by an axial surface area extending essentially parallel to the axis of the hydraulic bearing.

7 Claims, 3 Drawing Sheets

HYDRAULIC BEARING

BACKGROUND OF THE INVENTION

FIELD OF THE INVENTION

The present invention relates to a hydraulic bearing, including a supporting bearing and a bearing member braced against each other by an essentially truncated, conical elastic spring element of elastomeric material. The support member and bearing member bound a working chamber and a compensating chamber filled with damping fluid. The chambers are separated from one another by a dividing wall and are in fluid communication with one another via a damping channel. The elastic spring element has two compression-spring sections radially opposite one another and two push-action-spring sections radially opposite one another in the circumferential direction between the compression-spring sections.

DESCRIPTION OF THE PRIOR ART

A hydraulic bearing is shown in DE 37 07 445 A1. The elastic spring element is joined to the rotationally symmetrical supporting bearing and the bearing member by vulcanization, the elastic spring element having reniform areas with little material thickness lying opposite one other and symmetrically to a transverse axis, the areas consisting of thin-walled, curved rolling bellows. To achieve greater differences in the radial spring rates, the elastic spring element is divided by an intermediate ring.

SUMMARY OF THE INVENTION

A disadvantage in the previously known hydraulic bearing described above is that the heat conduction on the supporting bearing during the vulcanization is not very satisfactory due to the intermediate ring within the elastic spring element.

The object underlying the present invention is to further develop a hydraulic bearing in such a way that the radial spring rates of the compression-spring sections and the push-action-spring sections differ more strongly from one another, and that the vulcanization of the elastic spring element to the supporting bearing and the bearing member is improved—regardless of the material of the supporting bearing.

To fulfill the objectives of the present invention, the supporting bearing radially overlaps the elastic spring element in the compression-spring sections, the elastic spring element and the supporting bearing are interconnected by a radial surface area, and the supporting bearing and the elastic spring element in the push-action-spring sections are interconnected by an axial surface area extending essentially parallel to the axis of the hydraulic bearing. This is advantageous in that, due to the asymmetrical design of the supporting bearing, the radial spring rates of the compression-spring sections and the push-action-spring sections differ strongly from one another, there being no need for an elastic spring element in the intermediate ring. The compression-spring sections include soft transverse compression springs, the supporting bearing in these sections preferably being produced by turning. The strong push-action-springs demand a hard transverse bracing upon the introduction of radial vibrations in the direction of an imaginary plane interconnecting the push-action-spring sections. Relative to the compression spring, the push-action-spring is more massive and bonds to a large extent to the axial surface area of the supporting bearing.

The compression-spring sections and the push-action-spring sections can be connected by imaginary planes, the planes preferably being at right angles to one another.

Radially on the inside in the compression-spring sections, the supporting bearing preferably has a combined radial and axial stop extending in the axial direction, the radial and axial stop and the elastic spring element being radially set apart from each other by a pocket. The pockets within the compression-spring sections further reduce the spring stiffness of the soft transverse spring, which is an advantage deserving mention for many cases. Preferably, the pockets have a greater extension in the circumferential direction than the supporting bearing. The difference in the width of the pockets and the supporting bearing has an influence on the radial spring ratio between the compression-spring sections and the push-action-spring sections. The greater the width of the pocket relative to the width of the core, the more soft in the transverse direction the compression-spring sections are.

The supporting bearing can have an axial extension in the push-action-spring sections corresponding to the axial extension of the radial and axial stop in the compression-spring sections, the supporting bearing in the push-action-spring sections being configured integrally and continuously with an axial stop, and the supporting bearing and the axial stop being mutually bounded on the outer peripheral side by the axial surface area. The combined radial and axial stop of the compression-spring sections, as well as the axial stop of the push-action-spring sections are designed as spring-deflection stops to limit extreme excursion movements of the supporting bearing relative to the bearing member in the axial direction. To limit extreme excursion movements, for example, the stops come in contact with the dividing wall separating the working chamber and the compensating chamber from one another. Because of the integral design of the stop with the supporting bearing, the entire hydraulic bearing can be constructed simply and cost-effectively with few parts.

The working properties of the hydraulic bearing according to the invention are particularly advantageous when the ratio of the bonding surface area of the elastic spring element and the axial surface area to the bonding surface area of the elastic spring element and the radial surface area amounts to at least two. Because of this ratio, the compression spring in the compression-spring section is soft in the transverse direction, while in comparison, the push-action spring in the push-action-spring section is harder due to the large bonding surface area of the elastic spring element and the supporting bearing.

The axial surface area can be concavely curved, avoiding abrupt changes in direction. By the curvature of the supporting bearing, the bonding surface area to the axial surface area is enlarged, which is an advantage in view of further improved durability and the resulting, uniformly good working properties during the entire service life. The transverse-spring rate of the compression-spring sections is further reduced by the curvature.

The supporting bearing can be formed by a core consisting of a polymeric material, the core having at least one opening on the side facing away from the bearing member to receive a vulcanizing tool, and the wall thicknesses of the core being essentially identical. Supporting bearings made of a plastic are preferably used when the machine member supported on the supporting bearing radiates considerable heat in the direction of the hydraulic bearing, as is the case, for example, when the hydraulic bearing is used as a bearing for a combustion engine. The use of a plastic core sharply reduces the transmission of the heat emitted by the combustion engine into the elastic spring element. However, this effect, desirable as such during the operation of the hydraulic bearing, in principle makes the vulcanization of the plastic core to the elastic spring element more difficult. The opening to receive a vulcanizing tool makes it possible to submerge the vulcanizing tool into the openings to vulcanize the elastic spring element to the supporting bearing and to support the core. The remaining, relatively thinner wall thickness substantially facilitates the vulcanization of the core to the elastic spring element.

BRIEF DESCRIPTION OF THE DRAWINGS

In the following, the hydraulic bearing according to the invention is explained in more detail with the aid of the annexed drawings. They show.

DETAILED DESCRIPTION OF THE INVENTION

Figure 1:
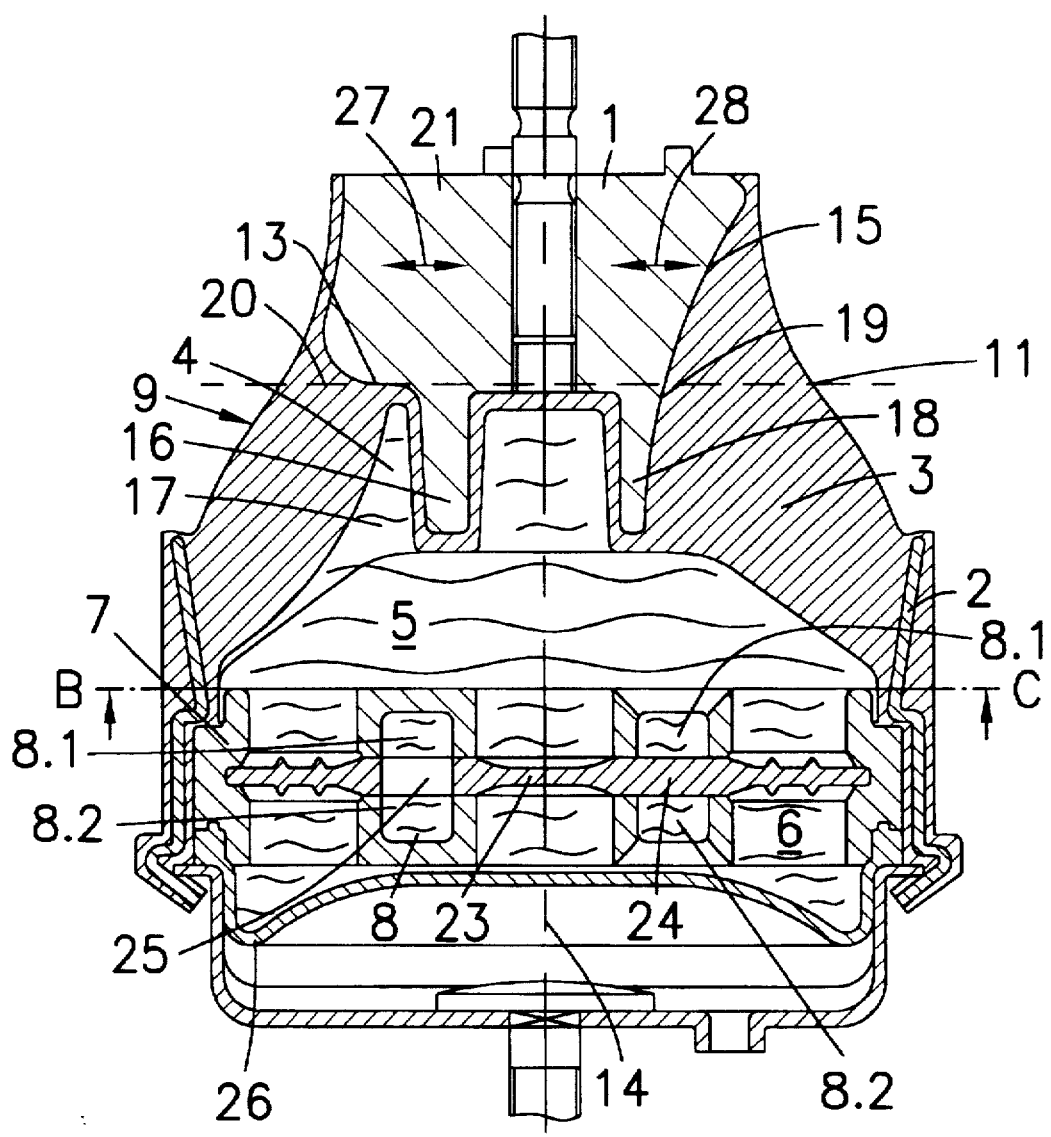
FIG. 1: A first exemplary embodiment having a supporting bearing of a metallic material in cross-sectional representation along the line A–B of FIG. 2.

In FIG. 1, an exemplary embodiment of a hydraulic bearing according to the invention is shown in which a supporting bearing 1 and a bearing member 2 are connected by elastic spring element 3. Working chamber 5 is bounded by supporting bearing 1, elastic spring element 3 and a dividing wall 7 and is filled with a damping fluid 4. Dividing wall 7 includes a damping channel 8 which connects working chamber 5 and compensating chamber 6 in a manner such that they are in fluid communication. In this example, damping channel 8 includes two subchannels 8.1, 8.2 which are arranged in a series connection. Subchannels 8.1, 8.2 are arranged axially on both sides of a diaphragm 23 made of elastomeric material. Diaphragm 23 is capable of vibrating, forms a component of dividing wall 7, and is provided with a channel separation 24 and having at least one opening 25 within channel separation 24 for the fluid communication of subchannels 8.1, 8.2 with one another. Subchannels 8.1, 8.2 each have a groove-shaped cross-section that is open axially in the direction of diaphragm 23, the front-side ends of subchannels 8.1, 8.2 and channel separation 24 of diaphragm 23 being sealingly braced against each other under axial prestressing.

It is advantageous with such a design of dividing wall 7 that the damping channel has a great length, but nevertheless, diaphragm 23 has a large surface for insulating higher-frequency vibrations.

Compensating chamber 6 is bounded on the side facing away from dividing wall 7 by a rolling bellows 26 of an elastomeric material and is capable of receiving, largely without pressure, liquid components from working chamber 5.

Figure 2:
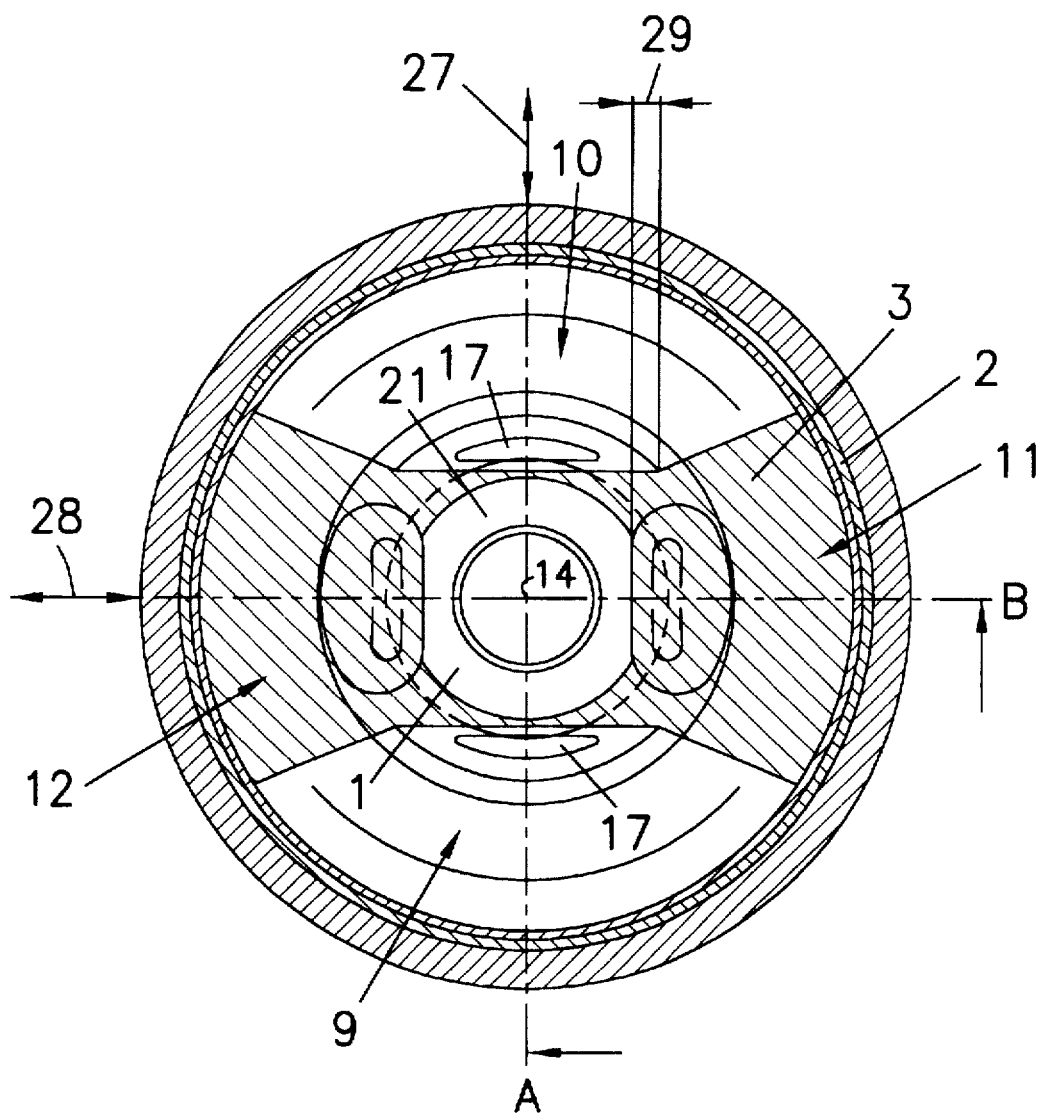
FIG. 2: A section through the hydraulic bearing from FIG. 1 along the line B–C.

The right-angled section A-B in FIG. 2 makes it possible to discern both a compression-spring section 9 and a push-action-spring section 11 in FIG. 1. Supporting bearing 1 in compression-spring section 9 is asymmetrical relative to push-action-spring section 11, as is elastic spring element 3. Supporting bearing 1 radially overlaps elastic spring element 3 in compression-spring section 9, the elastic spring element 3 being prevulcanized to a radial surface area 13 of supporting bearing 1. Supporting bearing 1 is provided in compression-spring sections 9, 10 with an integrally constructed, combined radial and axial stop 16, this radial and axial stop 16 being set apart from elastic spring element 3 in the radial direction by a pocket 17. The weak transverse direction is symbolized by the arrow having the reference numeral 27, the hard transverse direction is designated by the arrow having the number 28.

Elastic spring element 3 is vulcanized in push-action-spring sections 11, 12 to the axial surface area 15 of supporting bearing 1, axial surface area 15 extending essentially parallel to axis 14 of the hydraulic bearing. Push-action-spring sections 11, 12 of supporting bearing 1 comprise an axial stop 18 that is integrally constructed with supporting bearing 1 and forms a part of axial surface area 15. Radial and axial stop 16, as well as axial stop 18, extend axially for an equal distance into working chamber 5. Stops 16, 18 strike against dividing wall 7 to limit extreme axial excursion movements of supporting bearing 1 in the direction of bearing member 2.

In FIG. 2, a section is shown through the hydraulic bearing from FIG. 1 along the line B–C. It can be recognized that compression-spring sections 9, 10 and push-action-spring sections 11, 12 are distributed uniformly in the circumferential direction, an imaginary plane connecting the two compression-spring sections 9, 10 being arranged perpendicularly to an imaginary second plane interconnecting the two push-action-spring sections 11, 12. Pockets 17 arranged within elastic spring element 3 in compression-spring sections 9, 10 have a greater width than supporting bearing 1, the width difference 29 influencing the radial spring-rate ratio between compression-spring sections 9, 10 and push-action-spring sections 11, 12. To attain a spring rate of first compression-spring sections 9, 10 as soft in the transverse direction 27 as possible, the width of pockets 17 is greater than the width of supporting bearing 1.

Figure 3:
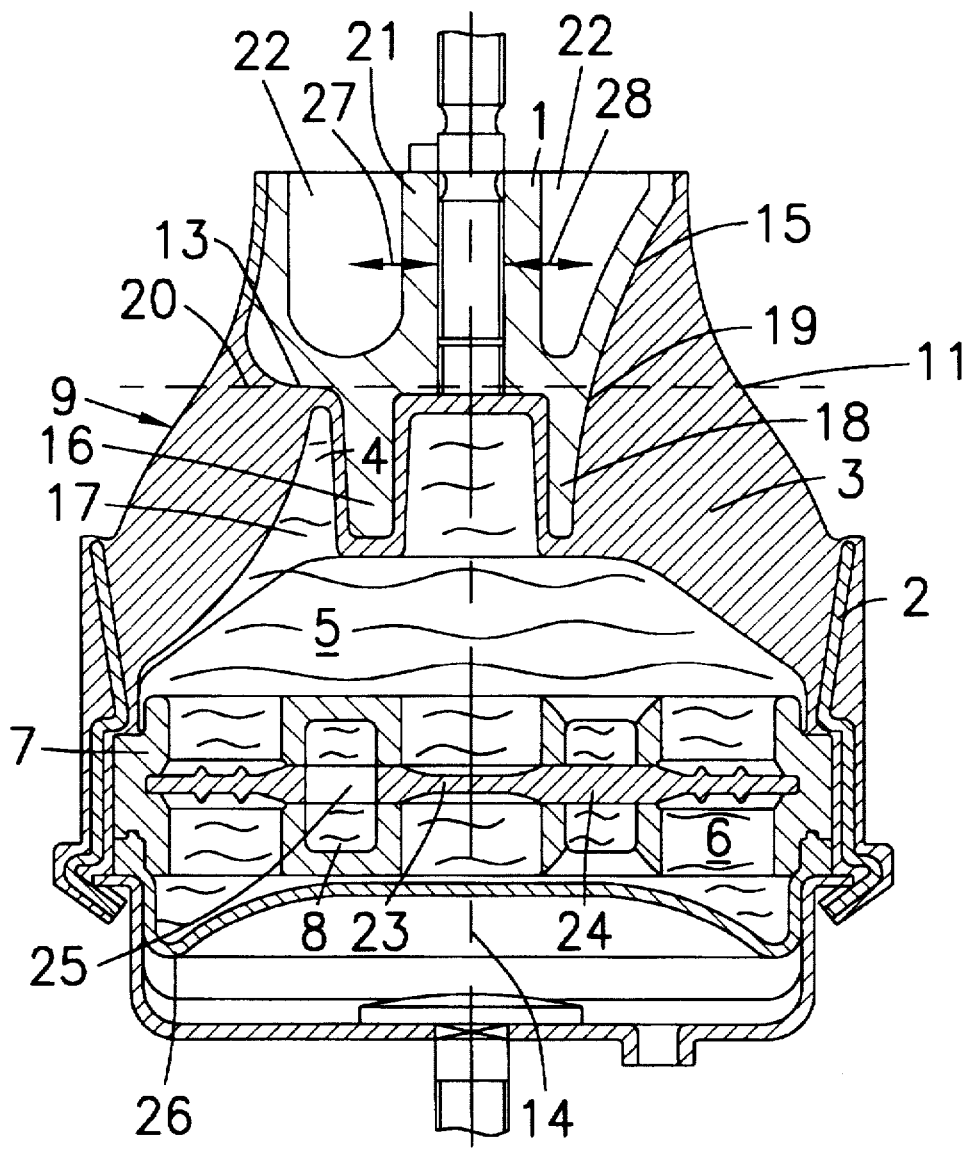
FIG. 3: A second exemplary embodiment of a hydraulic bearing, similar to the exemplary embodiment of FIG. 1, the supporting bearing being formed by a plastic core.

In FIG. 3 a second exemplary embodiment of the hydraulic bearing according to the invention is shown in which supporting bearing 1 consists of a core 21 of polymer material. Openings 22 are provided within core 21 to receive a vulcanizing tool. The wall thicknesses of core 21 are essentially identical.

In this exemplary embodiment as well, in the same way as in the exemplary embodiment according to FIG. 1, the bonding surface area 19 of push-action-spring sections 11, 12 to axial surface area 15 is perceptibly greater than the bonding surface area 20 of compression-spring sections 9, 10 to radial surface area 13.

I claim:

1. A hydraulic bearing comprising:

a supporting bearing;

a bearing member;

an elastic spring element comprising an elastomeric material connecting the supporting bearing and the bearing member, the elastic spring element bounding a working chamber and a compensating chamber, the working and compensating chambers being filled with a damping fluid, the elastic spring element comprising two compression-spring sections radially opposite one another and two push-action-spring sections radially opposite one another and circumferentially between the compression-spring sections, the supporting bearing radially overlapping the elastic spring element in the compression-spring sections, the elastic spring element and supporting bearing being interconnected by a radial surface area in the compression-spring sections, the supporting bearing and elastic spring element being interconnected by an axial surface area extending essentially parallel to axis of the hydraulic bearing in the push-action-spring sections; and a dividing wall, the working and compensating chambers being separated from one another by the dividing wall, the dividing wall comprising a damping channel, the working and compensating chambers being in fluid communication with one another via the damping channel.

2. The hydraulic bearing of claim 1, wherein:

the elastic spring element is an essentially truncated, conical spring element.

3. The hydraulic bearing of claim 1, wherein:

the supporting bearing comprises a combined radial and axial stop extending in the axial direction, and wherein the radial and axial stop and elastic spring element are radially set apart from each other by a pocket.

4. The hydraulic bearing of claim 3, wherein:

the push-action-spring sections have an axial extension corresponding to the axial extension of the radial and axial stop in the compression-spring sections, and wherein the supporting bearing adjacent the push-action-spring sections is configured integrally and continuously with an axial stop, and wherein the supporting bearing and the axial stop are mutually bounded by the axial surface area on an outer peripheral side.

5. The hydraulic bearing of claim 1, wherein:

the axial surface area is concavely curved.

6. A hydraulic bearing comprising:

a supporting bearing;

a bearing member;

an elastic spring element comprising an elastomeric material connecting the supporting bearing and the bearing member, the elastic spring element bounding a working chamber and a compensating chamber, the working and compensating chambers being filled with a damping fluid, the elastic spring element comprising two compression-spring sections radially opposite one another and two push-action-spring sections radially opposite one another and between the compression-spring sections, the supporting bearing radially overlapping the elastic spring element in the compression-spring sections, the elastic spring element and supporting bearing being interconnected by a radial surface area in the compression-spring sections, the supporting bearing and elastic spring element being interconnected by an axial surface area extending essentially parallel to axis of the hydraulic bearing in the push-action-spring sections;

a dividing wall, the working and compensating chambers being separated from one another by the dividing wall, the dividing wall comprising a damping channel, the working and compensating chambers being in fluid communication with one another via the damping channel; and a first bonding surface area between the elastic spring element and the axial surface area and a second bonding surface area between the elastic spring element and the radial surface area, and wherein the ratio of the first bonding surface area to the second bonding surface area is at least two to one.

7. A hydraulic bearing comprising:

a supporting bearing, the supporting bearing comprising a core comprising a polymeric material;

a bearing member, the core has at least one opening on a side facing away from the bearing member, the opening adapted to receive a vulcanizing tool, and wherein the wall thicknesses of the core are essentially identical;

an elastic spring element comprising an elastomeric material connecting the supporting bearing and the bearing member, the elastic spring element bounding a working chamber and a compensating chamber, the working and compensating chambers being filled with a damping fluid, the elastic spring element comprising two compression-spring sections radially opposite one another and two push-action-spring sections radially opposite one another and between the compression-spring sections, the supporting bearing radially overlapping the elastic spring element in the compression-spring sections, the elastic spring element and supporting bearing being interconnected by a radial surface area in the compression-spring sections, the supporting bearing and elastic spring element being interconnected by an axial surface area extending essentially parallel to axis of the hydraulic bearing in the push-action-spring sections; and a dividing wall, the working and compensating chambers being separated from one another by the dividing wall, the dividing wall comprising a damping channel, the working and compensating chambers being in fluid communication with one another via the damping channel.

* * * * *